(12) United States Patent
Bartolome et al.

(10) Patent No.: US 10,124,680 B1
(45) Date of Patent: Nov. 13, 2018

(54) METHODS AND SYSTEMS FOR PRE-CHARGING ON-BOARD CHARGER OF VEHICLE

(71) Applicant: Lear Corporation, Southfield, MI (US)

(72) Inventors: Jordi Tost Bartolome, Valls (ES); Antoni Ferre Fabregas, Valls (ES)

(73) Assignee: Lear Corporation, Southfield, MI (US)

( * ) Notice: Subject to any disclaimer, the term of this patent is extended or adjusted under 35 U.S.C. 154(b) by 27 days.

(21) Appl. No.: 15/635,528

(22) Filed: Jun. 28, 2017

(51) Int. Cl.
*B60L 11/18* (2006.01)
*H02J 7/00* (2006.01)
*H02J 7/02* (2016.01)
*H02J 7/04* (2006.01)

(52) U.S. Cl.
CPC ......... *B60L 11/1811* (2013.01); *H02J 7/0068* (2013.01); *H02J 7/022* (2013.01); *H02J 7/045* (2013.01)

(58) Field of Classification Search
CPC .................................................. B60L 11/1811
USPC ....................................................... 320/109
See application file for complete search history.

(56) References Cited

U.S. PATENT DOCUMENTS

| | | | |
|---|---|---|---|
| 5,581,171 A | 12/1996 | Kerfoot et al. | |
| 7,400,116 B2 | 7/2008 | Kato et al. | |
| 7,830,036 B2 | 11/2010 | Wei et al. | |
| 8,154,895 B2 | 4/2012 | Gilmore | |
| 8,612,073 B2 | 12/2013 | Fuji et al. | |
| 2003/0206021 A1* | 11/2003 | Laletin | G01R 31/3631 324/426 |
| 2006/0186861 A1 | 8/2006 | Takahashi et al. | |
| 2007/0145952 A1* | 6/2007 | Arcena | H02J 3/32 320/135 |
| 2012/0229100 A1 | 9/2012 | Trenchs et al. | |
| 2012/0306454 A1* | 12/2012 | Ransom | H02M 7/219 320/145 |
| 2013/0121051 A1 | 5/2013 | Weiss et al. | |
| 2013/0278224 A1* | 10/2013 | Ofek | H02M 7/219 320/137 |
| 2014/0354241 A1* | 12/2014 | Perisic | B60L 11/005 320/148 |
| 2015/0131343 A1 | 5/2015 | Hufnagel et al. | |

* cited by examiner

*Primary Examiner* — Suresh Memula
(74) *Attorney, Agent, or Firm* — Brooks Kushman P.C.

(57) ABSTRACT

An on-board charger for an electric vehicle includes a switch configured to receive an AC voltage, a capacitor connected to the switch and connectable to a traction battery of the electric vehicle, a frequency sensor, and a controller. The frequency sensor is configured to detect during the odd half-cycle of a first cycle of the AC voltage an instantaneous frequency of the AC voltage for the first cycle based on elapsed time between zero-voltage crossings of the odd half-cycle of the first cycle and not based on any other zero-voltage crossings of the AC voltage. The controller is configured to close the switch during the even half-cycle of the first cycle at a first trigger time dependent upon the instantaneous frequency of the AC voltage for the first cycle. The capacitor is enabled to be charged with the AC voltage via the switch while the switch is closed.

20 Claims, 5 Drawing Sheets

METHODS AND SYSTEMS FOR PRE-CHARGING ON-BOARD CHARGER OF VEHICLE

TECHNICAL FIELD

The present invention relates to pre-charging an on-board charger (OBC) of a vehicle.

BACKGROUND

An on-board charger (OBC) of an electric vehicle is used for charging a traction battery of the vehicle. The OBC charges the battery with electrical power from a mains supply. The electrical power from the mains supply is an AC electrical power. The battery is to be charged with DC electrical power. The OBC has an input which connects to the mains supply for the OBC to receive AC electrical power from the mains supply. The OBC converts AC electrical power received from the mains supply into DC electrical power. The OBC has an output which connects to the battery. The OBC provides the DC electrical power converted from the AC electrical power to the battery for charging the battery.

The OBC has one or more internal bulk capacitors (collectively "DC link capacitor"). The DC link capacitor is charged with the DC electrical power converted from the AC electrical power to have a DC voltage ("DC-link voltage"). In a stable operation mode of the OBC, the DC link voltage is a boosted, constant DC voltage. The DC link capacitor is connected to the traction battery through a DC/DC converter and, typically, a disconnection switch. The DC/DC converter is used for voltage adaption as the traction battery voltage could vary in a relatively wide range (for instance, 200V-400V) while the DC-link voltage is expected to be constant.

In a pre-charge operation mode of the OBC, the DC link capacitor is to be charged to the boosted, constant DC voltage. At the beginning of the pre-charge operation the DC link voltage is zero volts or a low voltage (i.e., the DC link capacitor is discharged or nearly discharged). The DC link capacitor is to be progressively charged so that inrush electrical currents are avoided. Inrush electrical currents could damage internal components of the OBC or the mains supply.

SUMMARY

An object is a pre-charge control strategy for an on-board charger (OBC).

Another object is a soft-start control strategy in a vehicle OBC to minimize input inrush electrical current peaks.

Another object is a soft-start control strategy in a vehicle OBC to provide immunity from domestic network (i.e., mains supply) noise.

Another object is to provide a soft charge of internal bulk capacitor(s) (i.e., the DC link capacitor) of a vehicle OBC by controlled triggering of power switches of the OBC to avoid inrush electrical current which may otherwise damage the domestic network or components of the OBC.

An OBC is provided. The OBC includes a switch configured to receive an AC voltage having a plurality of cycles each including an odd half-cycle and an even half-cycle, a capacitor connected to the switch and connectable to a traction battery of an electric vehicle, a frequency sensor, and a controller. The capacitor may be connectable to the traction battery through a DC/DC converter with or without a disconnection element. The frequency sensor is configured to detect during the odd half-cycle of a first cycle of the AC voltage an instantaneous frequency of the AC voltage for the first cycle based on elapsed time between zero-voltage crossings of the odd half-cycle of the first cycle and not based on any other zero-voltage crossings of the AC voltage. The controller is configured to close the switch during the even half-cycle of the first cycle at a first trigger time dependent upon the instantaneous frequency of the AC voltage for the first cycle. The capacitor is enabled to be charged with the AC voltage via the switch while the switch is closed.

Another OBC is provided. This OBC includes a first switch configured to receive an AC voltage having a plurality of cycles each including an odd half-cycle and an even half-cycle, a second switch configured to receive the AC voltage, a capacitor connected to the first switch and to the second switch and connectable to a traction battery of an electric vehicle, a sensor, and a controller. The capacitor may be connectable to the traction battery through a DC/DC converter with or without a disconnection element. The sensor is configured to detect during the odd half-cycle of a second cycle of the AC voltage an instantaneous frequency of the AC voltage for the odd half-cycle of the second cycle based on elapsed time between a voltage peak of the odd half-cycle of the second cycle and a voltage peak of the even half-cycle of a first cycle of the AC voltage. The controller is configured to close the first switch during the odd half-cycle of the second cycle at a first trigger time dependent upon the instantaneous frequency of the AC voltage for the odd half-cycle of the second cycle. The capacitor is enabled to be charged with the AC voltage via the first switch while the first switch is closed.

A method for an OBC is provided. The OBC includes a switch configured to receive an AC voltage having a plurality of cycles. Each cycle includes an odd half-cycle and an even half-cycle. The OBC further includes a capacitor connected to the switch and connectable to a traction battery of an electric vehicle. The capacitor may be connectable to the traction battery through a DC/DC converter with or without a disconnection element. The method includes detecting during the odd half-cycle of a first cycle of the AC voltage an instantaneous frequency of the AC voltage for the first cycle based on elapsed time between zero-voltage crossings of the odd half-cycle of the first cycle and not based on any other zero-voltage crossings of the AC voltage. The method further includes closing the switch during the even half-cycle of the first cycle at a first trigger time dependent upon the instantaneous frequency of the AC voltage for the first cycle, wherein the capacitor is enabled to be charged with the AC voltage via the switch while the switch is closed.

The method may further include detecting during the odd half-cycle of a second cycle of the AC voltage an instantaneous frequency of the AC voltage for the second cycle based on elapsed time between zero-voltage crossings of the odd half-cycle of the second cycle and not based on any other zero-voltage crossings of the AC voltage, and closing the switch during the even half-cycle of the second cycle at a second trigger time dependent upon the instantaneous frequency of the AC voltage for the second cycle.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
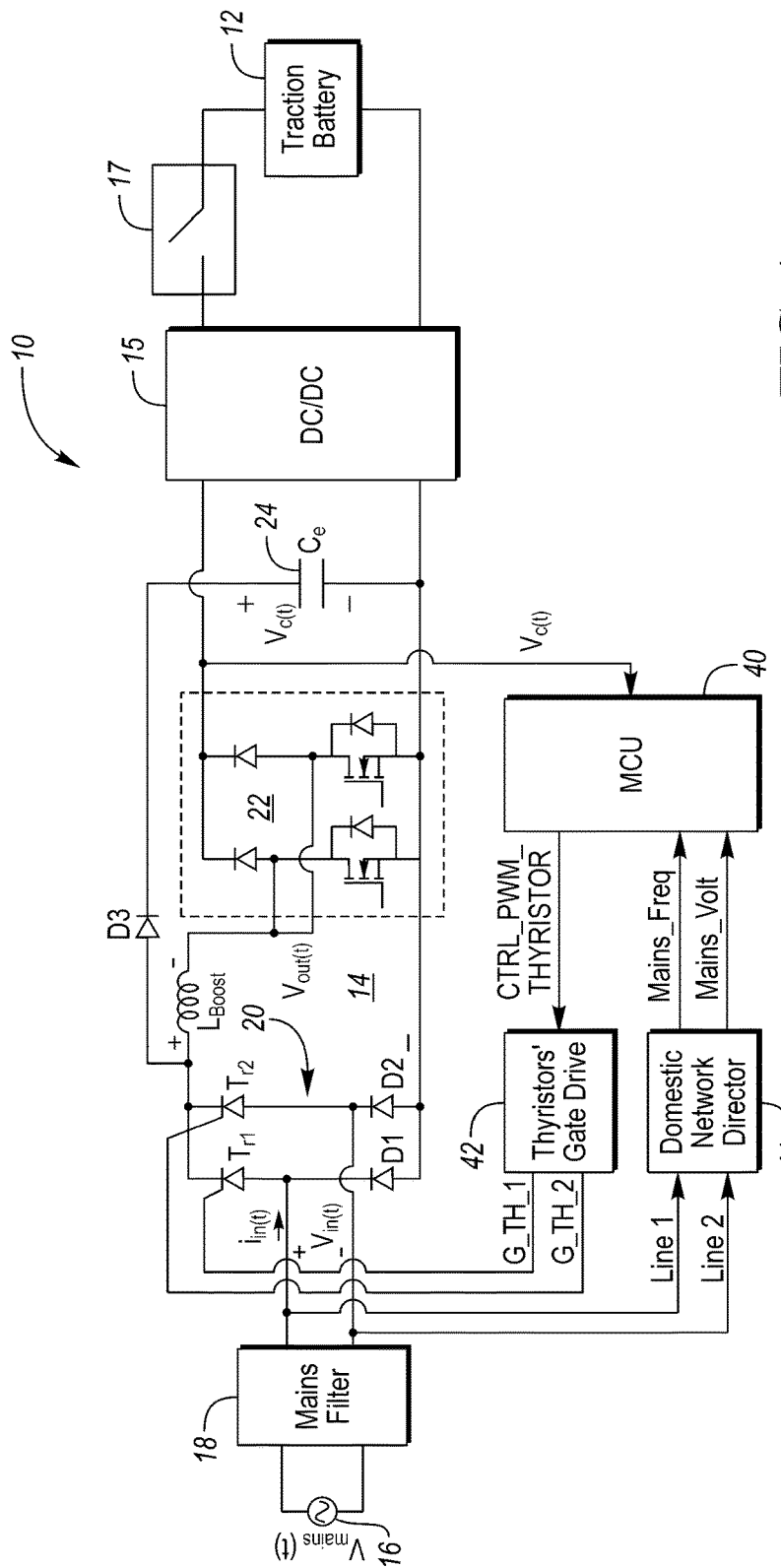
FIG. 1 illustrates a circuit and block diagram of an on-board charger (OBC)

Referring now to FIG. 1, a circuit and block diagram of an on-board charger (OBC) 10 is shown. OBC 10 is on-board an electric vehicle. OBC 10 is used for charging a traction battery 12 (or other loads) of the vehicle. OBC 10 includes a charger power stage 14. Charger power stage 14 receives AC electrical power from a mains supply (i.e., a domestic network power supply) 16, converts the received AC electrical power into DC electrical power, and charges traction battery 12 with the DC electrical power through a DC/DC converter 15 and a disconnection element (i.e., a switch) 17.

Charger power stage 14 includes an input filter 18, a full-bridge rectifier 20, a power factor converter (PFC) 22, and a DC link capacitor ("$C_{Bulk}$") 24. Input filter 18 is at the input side of charger power stage 14. Rectifier 20 follows input filter 18. PFC 22 follows rectifier 20. DC link capacitor 24 is at the output side of charger power stage 14. DC link capacitor 24 is one or more bulk capacitors which collectively comprise the DC link capacitor.

Input filter 18 is connected to mains supply 16 to receive an AC mains voltage ($v_{mains}(t)$) from the mains supply. The AC mains voltage has, for example, a root mean square (rms) voltage in the range of 100 V-240 V and a frequency of 50 or 60 Hz. Input filter 18 filters the AC mains voltage to reject high-frequency noise therefrom. Input filter 18 outputs the filtered AC mains voltage as an input AC voltage ($v_{in}(t)$) to rectifier 20.

Rectifier 20 rectifies the input AC voltage into an output DC voltage ($v_{out}(t)$). Rectifier 20 includes four rectifying elements connected in a full-bridge (i.e., diamond) configuration. The rectifying elements include first and second diodes, D1 and D2, and first and second thyristors, Tr1 and Tr2. Thyristors Tr1, Tr2 have triggering input voltages $v_{Tr1}$ and $v_{Tr2}$, respectively. When a thyristor is switched ON, current can flow through the thyristor. That is, the thyristor (i.e., a switch) is closed. Conversely, when a thyristor is switched OFF, current cannot flow through the thyristor. That is, the thyristor is opened.

A conductor connects the thyristors to PFC 22. Specifically, the cathodes of first thyristor Tr1 and second thyristor Tr2 are connected to each other and to PFC 22. The anodes of first diode D1 and second diode D2 are connected to each other. The cathode of first diode D1 is connected to the anode of first thyristor Tr1 and the cathode of second D2 is connected to the anode of second thyristor Tr2.

PFC 22 is connected in parallel to DC link capacitor 24. Charger power stage 14 further includes a third diode D3. Third diode D3 connects rectifier 20 to DC link capacitor 24 while bypassing PFC 22. Third diode D3 is a bypass for a pre-charge period as explained below.

DC-link capacitor 24 is connected to the input of DC/DC converter 15. As such, capacitor voltage (vc(t)) of DC link capacitor 24 is an input DC voltage to DC/DC converter 15. The output of DC/DC converter 15 is connected to the traction battery 12 though a disconnection element 17. The capacitor voltage is thus the DC voltage of the DC electrical power provided from charger power stage 14 for charging traction battery 12.

OBC 10 has two operation modes: a stable operation mode and a pre-charge operation mode. In the stable operation mode, DC link capacitor 24 is kept charged at a boosted, constant DC voltage. During the stable operation mode, PFC 22 receives the output DC voltage $v_{out}(t)$ from rectifier 20. PFC 22 improves AC/DC conversion (e.g., efficiency, smoothness, etc.) of the output DC voltage $v_{out}(t)$. As indicated in FIG. 1, PFC 22 includes power switch transistors and the like which are used to improve the AC/DC conversion. PFC 22 charges DC link capacitor 24 with the output DC voltage. DC link capacitor 24 thus has a capacitor voltage $v_c(t)$ from being charged with the output DC voltage.

In the pre-charge operation mode, DC link capacitor 24 is to be charged to the boosted, constant DC voltage. Third diode D3 is a bypass for the pre-charge period. At the beginning of the pre-charge operation the capacitor voltage of DC link capacitor 24 is zero volts or a low voltage (i.e., the DC link capacitor is discharged or nearly discharged). DC link capacitor 24 is to be progressively charged in a way inrush electrical currents are avoided. When either thyristor Tr1 or Tr2 is ON, the input current $i_{in}(t)$ is a function of the input AC voltage $v_{in}(t)$. In this case, the charging current flows through third diode D3, as PFC 22, which is mainly inductive, blocks any spurious current flow. On the other hand, to have a thyristor Tr1 or Tr2 ON, it is necessary to have a pulse in the respective thyristor gate input $v_{Tr1}$ or $v_{Tr2}$, together with a positive voltage between the anode, $v_{in}(t)$, and the cathode, $v_c(t)$, that is ($v_{in}(t) > v_c(t)$). This means that it is only necessary to trigger the thyristors Tr1 and Tr2 ON (closed) and the thyristors Tr1 and Tr2 will go OFF (opened) whenever the capacitor voltage $v_c(t)$ voltage is greater than the input AC voltage $v_{in}(t)$. Thus, the thyristors will switch to OFF at any zero crossing of the input AC voltage $v_{in}(t)$ (with minimum capacitor voltage $v_c(t)$ being zero volts).

Figure 2:
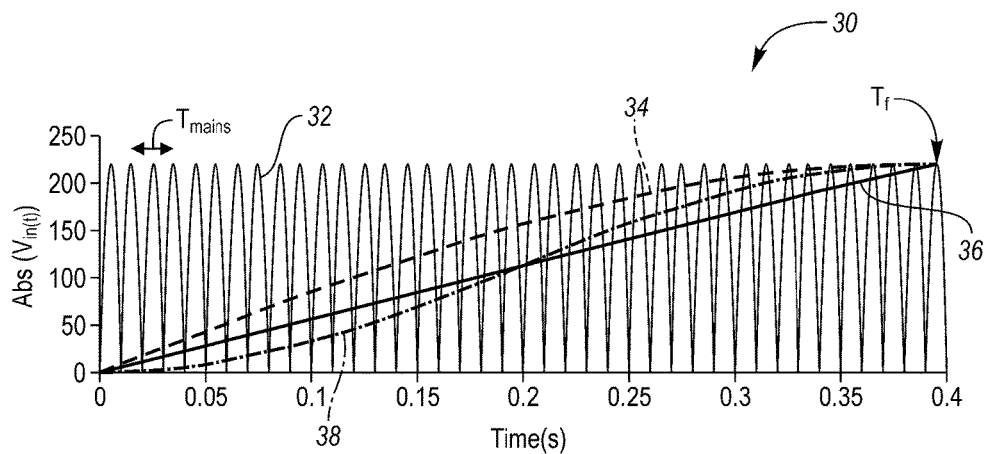
FIG. 2 illustrates a graph of a (rectified) input AC voltage $v_{in}(t)$ inputted to a rectifier of the OBC and three different resulting capacitor voltages $v_c(t)$ of an output DC link capacitor of the OBC during a pre-charge operation of the DC link capacitor in which the OBC progressively charges the DC link capacitor using electrical power from the input AC voltage.

Referring now to FIG. 2, with continual reference to FIG. 1, a graph 30 of (rectified) input AC voltage $v_{in}(t)$ inputted to rectifier 20 of OBC 10 and three different resulting capacitor voltages $v_c(t)$ of DC link capacitor 24 during a pre-charge operation in which the DC link capacitor is progressively charged using electrical power from the input AC voltage is shown. Graph 30 includes a plot 32 of input AC voltage $v_{in}(t)$, a plot 34 of a first resulting capacitor voltage $v_c(t)$, a plot 36 of a second resulting capacitor voltage $v_c(t)$, and a plot 38 of a third resulting capacitor voltage $v_c(t)$.

During the pre-charge operation, as the charging of DC link capacitor 24 is controlled by using short pulses of the input AC voltage $v_{in}(t)$, there will be different values of electrical current peaks depending on the duration of each pulse and on the voltage difference between the input AC voltage $v_{in}(t)$ and the output capacitor voltage $v_c(t)$. The input AC voltage $v_{in}(t)$ has the following expression:

$$v_{in}(t)=V_{mains}*\sin(2*\Pi*t/T_{mains}) \quad (1)$$

where $T_{mains}$ is the period of the input AC voltage and $V_{mains}$ is the maxim value of the input AC voltage. Plot 32 shown in FIG. 2 represents the (rectified) input AC voltage.

A possible strategy is using linearly longer pulses with width $W^{\#i}=\#i*T_{mains}/(4*Nc)$, where Nc is the number of pulses to perform the capacitor pre-charge. Plot 34 shown in FIG. 2 represents the resulting capacitor voltage. A problem is that this strategy generates relatively large currents, especially at the beginning of the pre-charge operation when capacitor 24 is totally discharged.

Therefore, to control and limit the current, instead of fixing directly the widths of the pulses, methods and systems in accordance with various embodiments for pre-charging DC link capacitor 24 (i.e., output capacitor of OBC 10) involve pre-determining the profile of the output capacitor voltage $v_c(t)$. Let this voltage be called $v_{out\_desired}(t)$. For instance, $v_{out\_desired}(t)$ could be set to be such as:

$$v_{out\_desired}(t)=V_{mains}*t/T_f \quad (2)$$

where $T_f=Nc*T_{mains}-T_{mains}/4=T_{mains}/4*[4Nc-1]$.

Another appropriate profile for the output capacitor voltage $v_c(t)$ could be:

$$V_{out\_desired}(t)=V_{mains}*\sin^2[\Pi/2*t/T_f] \quad (3)$$

Plots 36 and 38 shown in FIG. 2 represent the resulting capacitor voltage per expressions (2) and (3), respectively. $T_{mains}$ and $T_f$ are also shown in graph 30 of FIG. 2.

Methods and systems in accordance with various embodiments for pre-charging OBC 10 will now be described in fuller detail.

As shown in FIG. 1, OBC 10 further includes a microcontroller ("controller") 40, a gate driver 42 for thyristors T1 and T2, and a domestic network (i.e., mains supply) detector 44. Controller 40 is an electronic processor or the like configured to receive sensor signals and generate control signals based on the sensor signals. Gate driver 42 is configured to provide triggering input voltages $v_{Tr1}$ and $v_{Tr2}$ to thyristors Tr1 and Tr2, respectively.

Detector 44 is configured to detect (i.e., measure) the instantaneous frequency of the input AC voltage $v_{in}(t)$. Detector 44 can detect zero-voltage crossing times of the input AC voltage to determine the frequency of the input AC voltage. Detector 44 can detect the instantaneous frequency of the input AC voltage based on the immediate previous two zero-voltage crossing times of the input AC voltage.

Detector 44 is further configured to detect the instantaneous voltage (e.g., maximum value or rms value) of the input AC voltage.

Controller 40 may control the pre-charging of OBC 10 using the detected frequency and voltage of the input AC voltage $v_{in}(t)$. That is, controller 40 may control gate driver 42 to trigger thyristors Tr1 and/or Tr2 at times determined to be appropriate, for the pre-charging of OBC 10, based on the frequency and voltage of the input AC voltage. Controller 40 may also predict when the next zero-voltage crossing time of the input AC voltage based on the detected frequency of the input AC voltage. Controller 40 may further control the pre-charging of OBC 10 using such predicted next zero-voltage crossing times.

Figure 3:
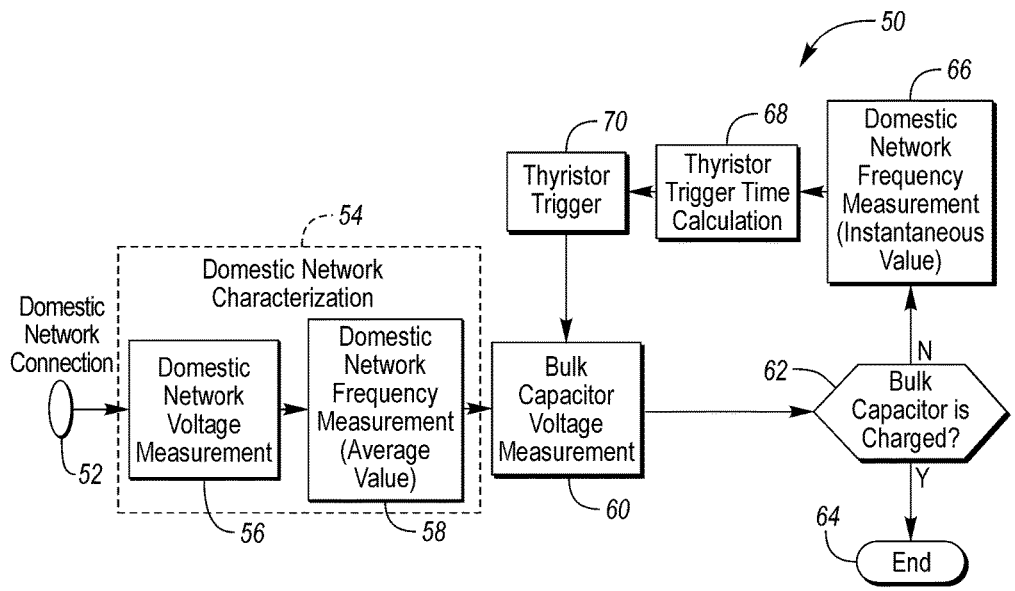
FIG. 3 illustrates a block diagram depicting steps of a pre-charging operation mode of the OBC for charging the DC link capacitor to a boosted, constant DC voltage.

Referring now to FIG. 3, with continual reference to FIGS. 1 and 2, a block diagram 50 depicting steps of the pre-charging operation mode of OBC 10 is shown. The pre-charging operation mode initiates upon OBC 10 being connected to mains supply 16 as indicated by start point 52. DC link capacitor 24 has zero volts or is charged with relatively little voltage and therefore is to be pre-charged to the boosted DC voltage value for the stable operation mode of OBC 10 to be reached. The input AC voltage $v_{in}(t)$ is provided to rectifier 20 of OBC 10 while the OBC is connected to mains supply 16.

Controller 40 initially conducts a domestic network (i.e., mains supply) characterization as indicated by block 54. The domestic network characterization involves detector 44 detecting the voltage of the input AC voltage $v_{in}(t)$ as indicated by block 56. The domestic network characterization further involves detector 44 detecting the frequency (average value) of the input AC voltage $v_{in}(t)$ as indicated by block 58. Controller 40 receives information regarding the detected voltage and frequency of the input AC voltage $v_{in}(t)$ to be apprised of general characteristics of the input AC voltage (e.g., 120V/60 Hz).

Following the domestic network characterization indicated by block 54, controller 40 implements a control loop in which the controller controls progressive charging of DC link capacitor 24 until the capacitor voltage $v_c(t)$ corresponds to the desired boosted DC voltage value. The operation of the control loop includes the capacitor voltage $v_c(t)$ being detected as indicated by block 60. Controller compares this detected capacitor voltage $v_c(t)$ with the desired boosted DC voltage value to determine whether DC link capacitor 24 is appropriately charged as indicated by decision block 62. DC link capacitor 24 is appropriately charged upon the capacitor voltage $v_c(t)$ reaching the desired boosted DC voltage value. If DC link capacitor 24 is appropriately charged, then the control loop ends as indicated by end-point 64 and the stable operation mode of OBC 10 commences.

If DC link capacitor 24 is not yet appropriately charged, then an iteration sequence of the control loop occurs. Each iteration involves detector 44 detecting an instantaneous value of the frequency of the input AC voltage $v_{in}(t)$ as indicated in block 66, controller 40 determining a trigger time for when a thyristor Tr1 or Tr2 is to be triggered as indicated in block 68, and gate driver 42 triggering the thyristor at the trigger time as indicated in block 70. Controller 40 determines the trigger time based on the detected instantaneous value of the frequency of the input AC voltage. In addition to using the instantaneous value of the frequency of the input AC voltage, controller 40 may also determine the trigger time using a detected voltage (e.g., maxim value or RMS value) of the input AC voltage.

When the thyristor is triggered, the input AC voltage $v_{in}(t)$ is provided via the triggered thyristor through rectifier 20 and third diode D3 to DC link capacitor 24 to charge the DC link capacitor. The charging occurs while input AC voltage $v_{in}(t)$ is greater than the capacitor voltage $v_c(t)$ until the input AC voltage $v_{in}(t)$ reaches a zero-voltage crossing time. The current iteration of the iteration sequence of the control loop terminates at the zero-voltage crossing time of the input AC voltage $v_{in}(t)$. Subsequent iterations of the iteration sequence are repeated until DC link capacitor 24 is appropriately charged.

Figure 4:
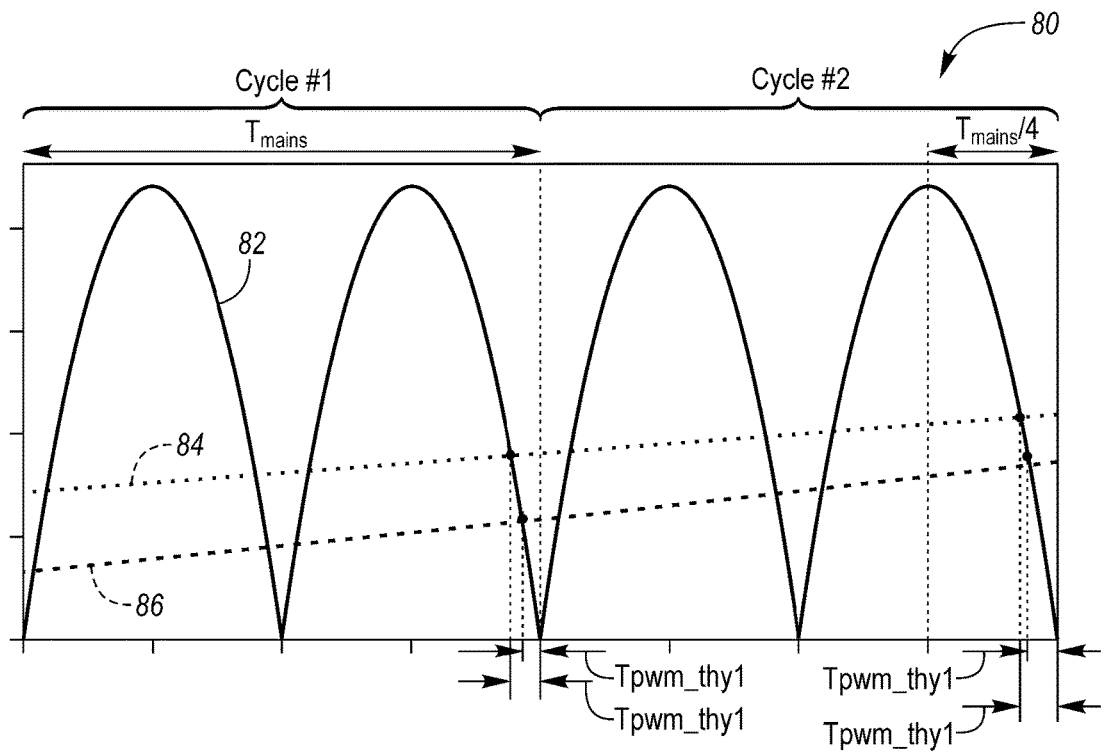
FIG. 4 illustrates a graph of two cycles of the (rectified) input AC voltage $v_{in}(t)$ inputted to a rectifier of the OBC, a first set of time-periods that a thyristor of the rectifier is to be activated in the two cycles for charging the DC link capacitor per a first pre-determined capacitor voltage profile, and a second set of time-periods that the thyristor is to be activated in the two cycles for charging the DC link capacitor per a second pre-determined capacitor voltage profile.

Referring now to FIG. 4, with continual reference to FIG. 2, a graph 80 of two cycles (i.e., wave cycles) of the (rectified) input AC voltage $v_{in}(t)$ inputted to rectifier 20, a first set of time-periods that a thyristor of the rectifier is to be activated in the two cycles for charging DC link capacitor 24 per the pre-determined capacitor voltage profile of expression (2), and a second set of time-periods that the thyristor is to be activated in the two cycles for charging the DC link capacitor per the pre-determined capacitor voltage profile of expression (3) is shown. Plot 82 represents the (rectified) input AC voltage $v_{in}(t)$, plot 84 represents the pre-determined capacitor voltage profile $v_{out\_desired}(t)$ per expression (2), and plot 86 represents the pre-determined capacitor voltage profile $v_{out\_desired}(t)$ per expression (3). (Recall that $v_{out\_desired}(t)$ is the pre-determined profile of the capacitor voltage $v_c(t)$.)

Controller 40 computes the period that the thyristor is to be activated ($T_{pwm\_thy\_\#i}$) in each cycle of the input AC voltage $v_{in}(t)$ by finding the time interval when $v_{out\_desired}(t) > v_{in}(t)$ in the last part of the cycle ($t > T_{mains}/4$). FIG. 4 shows $T_{pwm\_thy\_\#i}$ for two consecutive cycles of $V_{out\_desired}(t)$ marked by plot 84 for expression (3) and marked by plot 86 for expression (4). Each $T_{pwm\_thy}$ can be determined by controller 40 during run-time of OBC 10 or can be pre-computed and stored as a look up table in the controller.

Controller 40 can use different strategies in the case that controller 40 computes the vales of $T_{pwm\_thy\_\#i}$ in real-time (no look-up tables used). Two different strategies include a sequential measure-triggering strategy and a pipelined measure-triggering strategy.

Figure 5:
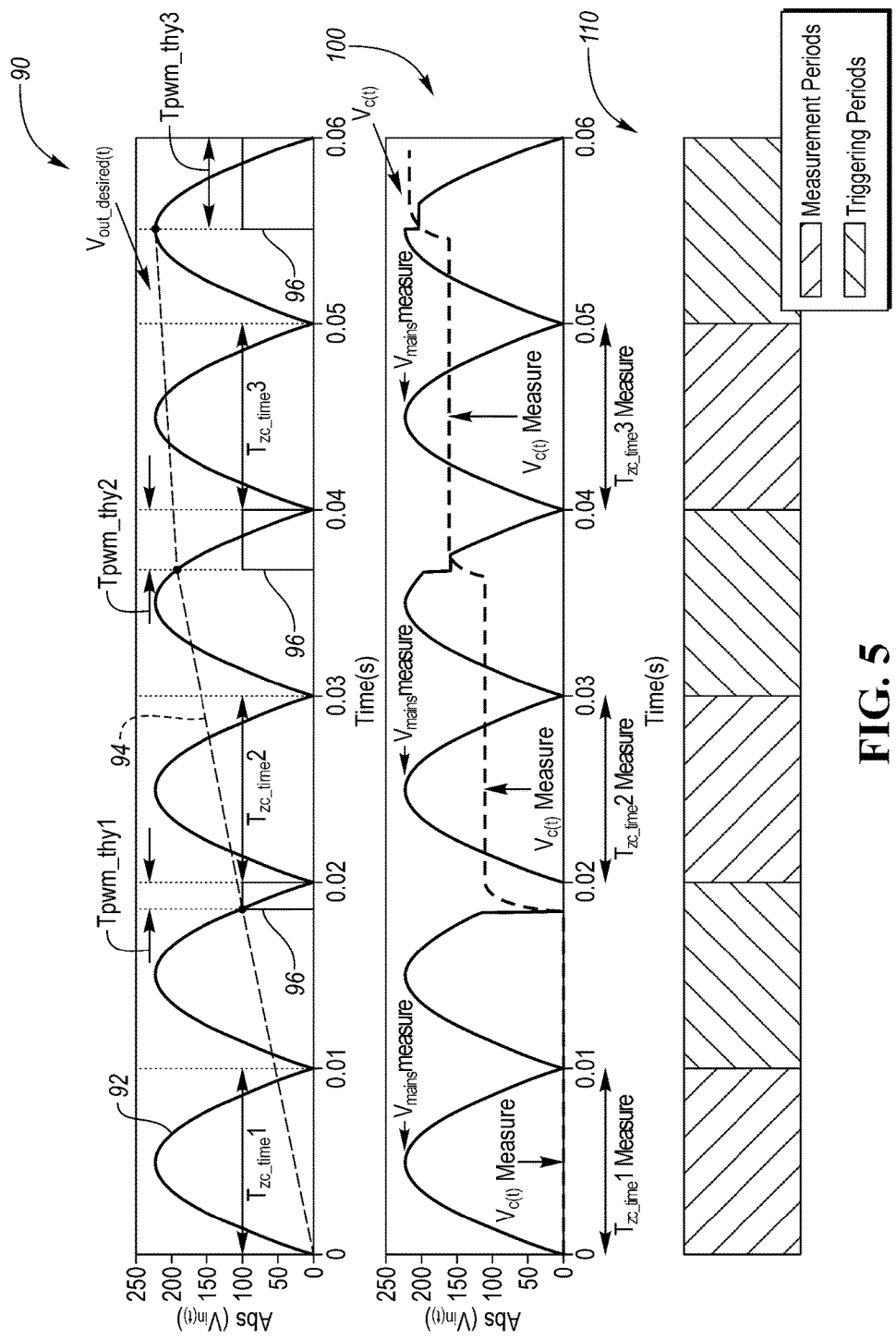
FIG. 5 illustrates graphs depicting operation of a sequential measure-triggering strategy for pre-charging the DC link capacitor in accordance with embodiments of the present invention.

FIG. 5 illustrates graphs depicting operation of the sequential measure-triggering strategy for pre-charging DC link capacitor 24. This depiction has the condition that Nc=3.

Top graph 90 of FIG. 5 illustrates mathematical functions used to find $T_{pwm\_thy\_\#i}$. (Rectified) input AC voltage Abs$(v_{in}(t))$ based on expression (1) is shown by plot 92. A desired pre-determined capacitor voltage profile $v_{out\_desired}(t)$ (such as per expression (2)) is shown by plot 94. This strategy is named sequential because $T_{zc\_time}$ is measured in one semi-cycle (i.e., a half cycle of a full cycle) (named "odd") and is used in the next semi-cycle (i.e., the other half cycle of the full cycle) (named "even") to find the interval $T_{pwm\_thy\_\#i}$ when the thyristor should be triggered. These time intervals (also known as activation pulses) are shown by plots 96. Note that $T_{zc\_time} = T_{mains}/2$.

Middle graph 100 of FIG. 5 illustrates the actual (rectified) input AC voltage Abs$(v_{in}(t))$ and the capacitor voltage $v_c(t)$. Notice that $T_{zc\_time}$ cannot be measured in "even" semi-cycles because when the thyristor is activated, it "pulls down" the input AC voltage to the DC link capacitor voltage $v_c(t)$. Consequently, it is impossible to measure the instant when $v_{in}(t)$ crosses zero. In other words, any frequency measurement based on zero crossing circuitry or minimal value will be affected by the pre-charge process itself. Accordingly, methods and systems in accordance with various embodiments for pre-charging OBC 10 employ separate frequency measurement periods and triggering periods alternatively (alternating measurement and triggering periods) as shown in bottom graph 110 of FIG. 5.

With further reference to FIG. 5, the sequential measure-triggering strategy operates as follows.

Let the variable named "flag" indicate what the system should do in next loop:
flag=0→Do nothing
flag=1→Close thyristors
flag=2→Open thyristors The algorithm is executed for each cycle of the input AC voltage, from 1 to Nc. That means the algorithm needs to run from 1 to 2*Nc semi-cycles in total.

In each first semi-cycle, corresponding to "odd" values of the counter of number of semi-cycles, measurement of actual values of $T_{mains}$, $V_{mains}$ and $v_c(t)$ is done. $T_{mains}$ is measured by monitoring the zero-crossing of the input AC voltage $v_{in}(t)$ at the beginning and the end of the semi-cycle. $V_{mains}$ is measured by monitoring the maximum value of the input AC voltage during the semi-cycle or by monitoring the rms value of the input AC voltage during the semi-cycle. The capacitor voltage $v_c(t)$ is approximately constant during the semi-cycle and can therefore be monitored at any time during the semi-cycle.

In each second semi-cycle, corresponding to "even" values of the counter of number of semi-cycles, is when the conditions to activate or deactivate the thyristors are done. The strategy will be executed at periodic points of time, separated by a given time named $t_{step}$. For instance, if $T_{mains}$=20 ms and the $t_{step}$=1 µs, then $N_{step}$=2000.

Figure 6:
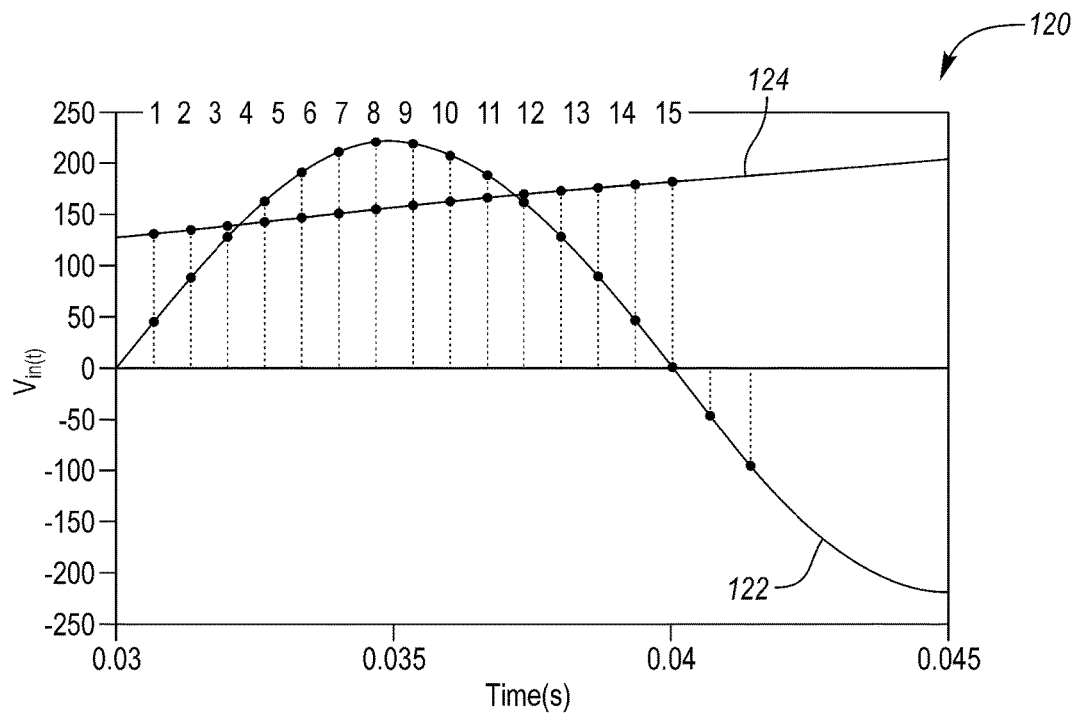
FIG. 6 illustrates a graph of the input AC voltage $v_{in}(t)$ and a desired pre-determined capacitor voltage profile $v_{out\_desired}(t)$ of the DC link capacitor for explaining when a thyristor is closed and opened during pre-charging of the DC link capacitor.

Now consider FIG. 6. FIG. 6 illustrates a graph 120 of the input AC voltage $v_{in}(t)$ (represented by plot 122) and the desired pre-determined capacitor voltage profile $v_{out\_desired}(t)$ (represented by plot 124) for explaining when a thyristor is closed and opened during pre-charging of DC link capacitor 24. In FIG. 6, it is given that Nstep=15. All periodic points when the algorithm evaluates the conditions for activating or deactivating the thyristor are labelled from 1 to 15 in FIG. 6. At the start of this loop, flag=0. Let j=1. The algorithm runs until the condition (flag==0) and evaluates $v_{in}(1*t_{stop})$, $v_{in}(3*t_{step})$, $v_{out\_desired}(1*t_{step})$, $v_{out\_desired}(3*t_{step})$ and performs the operation $v_{in}(1*t_{step}) > v_{out\_desired}(1*t_{step})$ AND $v_{in}(3*t_{step}) < v_{out\_desired}(3*t_{step})$. Since, clearly this condition is not met at the start of the loop, the flag will not change the status and will end the loop for j=1. In the next loop (j=2), since flag=0, no activation of the thyristor will be done.

Now, consider j=10. Flag will still be equal to 0. When the algorithm reaches the condition (flag==0), $v_{in}(10*t_{step})$, $v_{in}(12*t_{step})$, $v_{out\_desired}(10*t_{step})$, $v_{out\_desired}(12*t_{step})$ will be evaluated and the operation $v_{in}(10*t_{step}) > v_{out\_desired}(10*t_{step})$ AND $v_{in}(12*t_{step}) < v_{out\_desired}(12*t_{step})$ will be performed. In this case, the condition is TRUE and flag will be set to 1. In other words, when j=11, input AC voltage $v_{in}(t)$ and the desired capacitor voltage $v_{out\_desired}(t)$ are crossing (crossing point 126). Therefore, it is the desired time to trigger the thyristor to charge DC link capacitor 24 at this voltage value.

When the conditions (flag==1) AND $v_{in}(t_{now}+t_{guard}) < 0$ are TRUE, flag will be set to 2. For instance, suppose that $t_{guard}=3*t_{step}$. In this case, when j=13, $v_{in}(16*t_{step}) < 0$ and flag will be set to 2. Therefore, when j=14, the thyristor will be deactivated.

The control algorithm for the "Sequential measure-triggering strategy" is as follows:
flag=0;
for i=1 to 2*$N_c$
{
if i==odd /* Measurement period */
{measure $T_{mains}$; measure $V_{mains}$; measure $v_c(t)$}

```
if i==even /* Triggering period */
{for j=1 to N_step /* N_step=T_mains/(2*t_step) */
{
t_now*j*t_step;
compute v_in(t_now), v_in(t_now+t_step), v_in(t_now+2*t_step), v_in
    (t_now+t_guard);
/*Computed using expression (1) and updated T_mains and
V_mains measured previously*/
compute  V_out_desired(t_now),  v_out_desired(t_now+2*t_step);
    /*Computed using expression (2) or (3) and updated
    values of T_mains and V_mains measured previously*/
if flag==2
{deactivate thyristor; flag=0}
if flag==1
{activate thyristor;
if v_in(t_now+t_guard)<0 /* Zero-crossing of V_in expected after
    t_guard */
{flag=2}
}
if flag==0
{if  (v_in(t_now)>v_out_desired(t_now)  AND  v_in(t_now+2*t_step)
    <v_out_desired(t_now+2*t_step))
{flag=1} /* V_in and V_out_desired crossing expected in next
    t_step */
}
} /* end for j */
}
} /* end for i */
```

Figure 7:
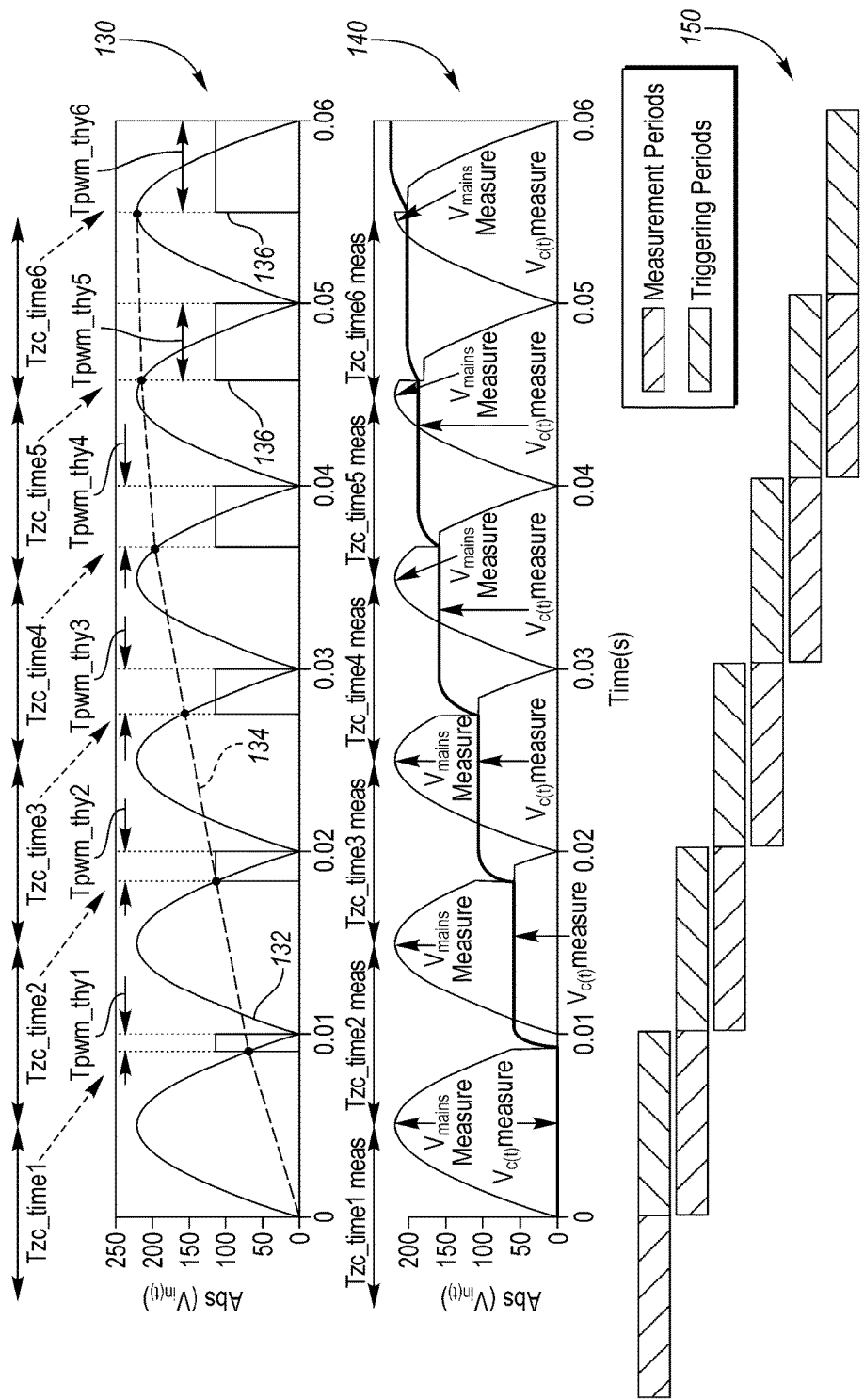
FIG. 7 illustrates graphs depicting operation of a pipelined measure-triggering strategy for pre-charging the DC link capacitor in accordance with embodiments of the present invention.

FIG. 7 illustrates graphs depicting operation of the pipelined measure-triggering strategy for pre-charging DC link capacitor 24. This strategy produces faster pre-charges with same current or smaller currents with same pre-charge time as previous strategy.

Top graph 130 of FIG. 7 illustrates mathematical functions used to find $T_{pwm\_thy\_\#i}$. (Rectified) input AC voltage Abs($v_{in}$(t)) based on expression (1) is shown by plot 132. A desired pre-determined capacitor voltage profile $v_{out\_desired}$(t) (such as per expression (3)) is shown by plot 134. The determined time intervals (also known as activation pulses) that thyristor is to be triggered are shown by plots 136.

Middle graph 140 of FIG. 5 illustrates the actual (rectified) input AC voltage Abs($v_{in}$(t)) and the capacitor voltage $v_c$(t).

This strategy is named pipelined because measuring of $T_{mains}$, $V_{mains}$, and $v_c$(t) is done continuously, in each semi-cycle. The triggering is also activated at each cycle per the computation based on the values measured at the previous semi-cycle. In this case, frequency measurement is based on max peak detection. Maximum values are not affected by the thyristor trigger effect explained on the previous method as it is only affecting the minimum values of ABS(sin(wt)). In this way, measurement and triggering can be handled in parallel (as shown in bottom graph 150 of FIG. 7), computing next trigger time at the same cycle the thyristors are triggered. As an example, FIG. 7 shows this strategy for Nc=3.

The control algorithm for the "Pipelined measure-triggering strategy" is as follows:

```
flag = 0;
for i = 1 to 2*N_c
{
    get T_mains;  /* Measurement started in previous semi-cycle */
    get V_mains;  /* Measurement started in previous semi-cycle */
    get v_c(t);   /* Measurement started in previous semi-cycle */
    for j=1 to N_step
    {
        t_now = j * t_step;  /* N_step = T_mains/ (2*t_step) */
        compute v_in(t_now), v_in(t_now+ t_step), v_in(t_now+2 *t_step),
    v_in(t_now+ t_guard);
        /* Computed using expression (1) and updated T_mains and V_mains
    with measurement started in previous semi-cycle */
        compute V_out_desired(t_now), V_out_desired(t_now+2 *t_step);
        /* Computed using expression (2) or (3) and updated values of
    T_mains and V_mains with measurement started in previous semi-cycle */
        if flag == 2
            {deactivate thyristor; flag = 0}
        if flag == 1
            {activate thyristor;
            if v_in(t_now+t_guard) < 0
            /* Zero-crossing of v_in expected after t_guard */
                {flag = 2;}
            }
        if flag == 0
            {if (v_in(t_now) > v_out_desired(t_now) AND v_in(t_now + 2*t_step) <
    v_out_desired(t_now+2*t_step))
                {flag=1; } /*v_in and v_out_desired crossing expected in next
    t_step */
            }
    } /* end for j */
}  /* end for i */
```

The pipelined algorithm is similar to the previous sequential algorithm. However, the pipelined algorithm requires specific hardware to make possible to measure $T_{mains}$ and $V_{mains}$ when the trigger is activated. Therefore, the sequential algorithm is preferred for implementation since hardware complexity is reduced.

Also, to reduce the CPU load, the computation of expressions (1), (2), or (3) could be done off-line and stored as look-up tables in controller 40. In this case, the algorithm behaves the same, but the values are recovered from CPU memory and not computed.

The control algorithm for "Sequential measure-triggering strategy" considering lookup tables would look like this:

```
lookUpTableIndex=0;                              freqAv=0;
mainsDetected=FALSE;
ThyristorState=OFF; cycleType=MEASURING;
Get Vmains, MainsFreq, Vout;
if (mainsDetected=FALSE){
    if MainsFreq==50
        mainsDetected=TRUE; freqAv=50;
    else if MainsFreq=60
        mainsDetected=TRUE; freqAv=60;
    else
        mainsDetected=FALSE;
    ThyristorState=OFF;
}else{
    if (ThyristorState==ON){
    ThyristorState=OFF;
    DeactivateThyristor( );
    }else{
        if(cycleType==MEASURING){
            cycleType=TRIGGERING;
            ComputeTimeToActivateThyristor(freqAv);
    /* Function to get the time depending on V_out and frequency */
        }else{
            cycleType=MEASURING;
            ThyristorState=ON;
            ProgramThyristorActivationTime(MainsFreq);
        }
    }
}
```

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An on-board charger for an electric vehicle, the on-board charger comprising:
a switch configured to receive an AC voltage having a plurality of cycles, each cycle including an odd half-cycle and an even half-cycle;
a capacitor connected to the switch and connectable to a traction battery of the electric vehicle;
a frequency sensor configured to detect during the odd half-cycle of a first cycle of the AC voltage an instantaneous frequency of the AC voltage for the first cycle based on elapsed time between zero-voltage crossings of the odd half-cycle of the first cycle and not based on any other zero-voltage crossings of the AC voltage; and
a controller configured to close the switch during the even half-cycle of the first cycle at a first trigger time dependent upon the instantaneous frequency of the AC voltage for the first cycle, wherein the capacitor is enabled to be charged with the AC voltage via the switch while the switch is closed.

2. The on-board charger of claim 1 wherein:
the frequency sensor is further configured to detect during the odd half-cycle of a second cycle of the AC voltage an instantaneous frequency of the AC voltage for the second cycle based on elapsed time between zero-voltage crossings of the odd half-cycle of the second cycle and not based on any other zero-voltage crossings of the AC voltage; and
the controller is further configured to close the switch during the even half-cycle of the second cycle at a second trigger time dependent upon the instantaneous frequency of the AC voltage for the second cycle.

3. The on-board charger of claim 2 wherein:
the instantaneous frequency of the AC voltage for the first cycle has a value different than a value of the instantaneous frequency of the AC voltage for the second cycle.

4. The on-board charger of claim 1 further comprising:
a voltage sensor configured to detect during the odd half-cycle of the first cycle of the AC voltage at least one of a maximum value and a root-mean-square (rms) value of the AC voltage for the first cycle; and
wherein the first trigger time is further dependent on the at least one of the maximum value and the rms value of the AC voltage for the first cycle.

5. The on-board charger of claim 4 wherein:
the frequency sensor is further configured to detect during the odd half-cycle of a second cycle of the AC voltage an instantaneous frequency of the AC voltage for the second cycle based on elapsed time between zero-voltage crossings of the odd half-cycle of the second cycle and not based on any other zero-voltage crossings of the AC voltage; and
the controller is further configured to close the switch during the even half-cycle of the second cycle at a second trigger time dependent upon the instantaneous frequency of the AC voltage for the second cycle.

6. The on-board charger of claim 5 wherein:
the voltage sensor is further configured to detect during the odd half-cycle of the second cycle of the AC voltage at least one of a maximum value and a rms value of the AC voltage for the second cycle; and
wherein the second trigger time is further dependent on the at least one of the maximum value and the rms value of the AC voltage for the second cycle.

7. The on-board charger of claim 1 wherein:
the switch is a thyristor.

8. The on-board charger of claim 7 further comprising:
a rectifier; and
wherein the thyristor is an element of the rectifier.

9. The on-board charger of claim 8 wherein:
the rectifier further includes a second thyristor.

10. An on-board charger for an electric vehicle, the on-board charger comprising:
a first switch configured to receive an AC voltage having a plurality of cycles, each cycle including an odd half-cycle and an even half-cycle;
a second switch configured to receive the AC voltage;
a capacitor connected to the first switch and to the second switch and connectable to a traction battery of the electric vehicle;
a sensor configured to detect during the odd half-cycle of a second cycle of the AC voltage an instantaneous frequency of the AC voltage for the odd half-cycle of the second cycle based on elapsed time between a voltage peak of the odd half-cycle of the second cycle and a voltage peak of the even half-cycle of a first cycle of the AC voltage; and
a controller configured to close the first switch during the odd half-cycle of the second cycle at a first trigger time dependent upon the instantaneous frequency of the AC voltage for the odd half-cycle of the second cycle, wherein the capacitor is enabled to be charged with the AC voltage via the first switch while the first switch is closed.

11. The on-board charger of claim 10 wherein:
the first trigger time is further dependent upon the voltage peak of the odd half-cycle of the second cycle.

12. The on-board charger of claim 10 wherein:
the sensor is further configured to detect during the even half-cycle of the second cycle of the AC voltage an instantaneous frequency of the AC voltage for the even half-cycle of the second cycle based on elapsed time between a voltage peak of the even half-cycle of the second cycle and the voltage peak of the odd half-cycle of the second cycle; and
the controller is further configured to close the second switch during the even half-cycle of the second cycle at a second trigger time dependent upon the instantaneous frequency of the AC voltage for the even half-cycle of the second cycle, wherein the capacitor is enabled to be charged with the AC voltage via the second switch while the second switch is closed.

13. The on-board charger of claim 12 wherein:
the second trigger time is further dependent upon the voltage peak of the even half-cycle of the second cycle.

14. The on-board charger of claim 12 wherein:
the instantaneous frequency of the AC voltage for the odd half-cycle of the second cycle has a value different than a value of the instantaneous frequency of the instantaneous frequency of the AC voltage for the even half-cycle of the second cycle.

15. The on-board charger of claim 12 wherein:
the sensor is further configured to detect during the odd half-cycle of a third cycle of the AC voltage an instantaneous frequency of the AC voltage for the odd half-cycle of the third cycle based on elapsed time between a voltage peak of the odd half-cycle of the third cycle and the voltage peak of the even half-cycle of the second cycle; and the controller is further configured to close the first switch during the odd half-cycle of the third cycle at a third trigger time dependent upon the instantaneous frequency of the AC voltage for the odd half-cycle of the third cycle.

16. The on-board charger of claim 15 wherein:
the third trigger time is further dependent upon the voltage peak of the odd half-cycle of the third cycle.

17. The on-board charger of claim 10 wherein:
the first switch is a first thyristor and the second switch is a second thyristor.

18. A method for an on-board charger of an electric vehicle, the on-board charger including a switch configured to receive an AC voltage having a plurality of cycles, each cycle including an odd half-cycle and an even half-cycle, the on-board charger further including a capacitor connected to the switch and connectable to a traction battery of the electric vehicle, the method comprising:

detecting during the odd half-cycle of a first cycle of the AC voltage an instantaneous frequency of the AC voltage for the first cycle based on elapsed time between zero-voltage crossings of the odd half-cycle of the first cycle and not based on any other zero-voltage crossings of the AC voltage; and closing the switch during the even half-cycle of the first cycle at a first trigger time dependent upon the instantaneous frequency of the AC voltage for the first cycle, wherein the capacitor is enabled to be charged with the AC voltage via the switch while the switch is closed.

19. The method of claim 18 further comprising:
detecting during the odd half-cycle of a second cycle of the AC voltage an instantaneous frequency of the AC voltage for the second cycle based on elapsed time between zero-voltage crossings of the odd half-cycle of the second cycle and not based on any other zero-voltage crossings of the AC voltage; and closing the switch during the even half-cycle of the second cycle at a second trigger time dependent upon the instantaneous frequency of the AC voltage for the second cycle.

20. The method of claim 19 wherein:
the instantaneous frequency of the AC voltage for the first cycle has a value different than a value of the instantaneous frequency of the AC voltage for the second cycle.

* * * * *